(12) United States Patent
Xie et al.

(10) Patent No.: US 11,238,620 B2
(45) Date of Patent: Feb. 1, 2022

(54) IMPLICIT STRUCTURED LIGHT DECODING METHOD, COMPUTER EQUIPMENT AND READABLE STORAGE MEDIUM

(71) Applicants: Tsinghua Shenzhen International Graduate School, Shenzhen (CN); Tsinghua University, Beijing (CN)

(72) Inventors: Xiang Xie, Beijing (CN); Jiawen Xue, Beijing (CN); Guolin Li, Beijing (CN); Songping Mai, Beijing (CN); Zhihua Wang, Beijing (CN)

(73) Assignees: Tsinghua Shenzhen International Graduate School, Shenzhen (CN); Tsinchua University, Beijing (CN)

( * ) Notice: Subject to any disclaimer, the term of this patent is extended or adjusted under 35 U.S.C. 154(b) by 0 days.

(21) Appl. No.: 16/860,737

(22) Filed: Apr. 28, 2020

(65) Prior Publication Data
US 2021/0319594 A1    Oct. 14, 2021

(30) Foreign Application Priority Data
Apr. 8, 2020    (CN) .......................... 202010268291.8

(51) Int. Cl.
| | | |
|---|---|---|
| G06K 9/36 | (2006.01) | |
| G06T 9/20 | (2006.01) | |
| G06K 9/62 | (2006.01) | |

(52) U.S. Cl.
CPC ............. *G06T 9/20* (2013.01); *G06K 9/6267* (2013.01)

(58) Field of Classification Search
CPC ....... H04N 19/00278; H04N 19/00951; H04N 7/26; H04N 19/00587; H04N 19/0063;
(Continued)

(56) References Cited

U.S. PATENT DOCUMENTS

| | | | | |
|---|---|---|---|---|
| 9,288,373 B2 * | 3/2016 | Xie | .......................... | G06F 3/017 |
| 2011/0255303 A1 * | 10/2011 | Nichol | ................ | G02B 6/0028 |
| | | | | 362/606 |

(Continued)

FOREIGN PATENT DOCUMENTS

| | | |
|---|---|---|
| CN | 107798698 | 3/2018 |
| CN | 109556533 | 4/2019 |

(Continued)

OTHER PUBLICATIONS

Zheng et al., 3D Curve Structure Reconstruction from a Sparse Set of Unordered Images, Computers in Industry 60, 2009, 9 pages.
(Continued)

*Primary Examiner* — Duy M Dang
(74) *Attorney, Agent, or Firm* — Hanley, Flight & Zimmerman, LLC

(57) ABSTRACT

A implicit structured light decoding method, a computer equipment and a computer-readable storage medium. The method includes: traversing an image captured by a camera to acquire a grayscale value of each pixel point and an ideal neighborhood grayscale distribution; extracting and outputting an updated output image according to the grayscale value of each pixel point and the ideal neighborhood grayscale distribution and in combination with a preset output image; classifying stripe central points in the updated output image into different stripes; determining a correspondence between stripes in the updated output image and stripes in a structured light image according to the different stripes; and decoding all stripe central points by using triangulation method in combination with the correspondence between the extracted stripes and the projected stripe pattern. This solution can efficiently and robustly decode the implicit stripe-based structured light on a basis of ensuring precision.

20 Claims, 8 Drawing Sheets

(58) Field of Classification Search
CPC ...... H04N 5/23251; G06K 9/36; G06T 3/602; G06T 9/00; G06T 9/20; G06T 7/50; G06T 7/13
See application file for complete search history.

(56) References Cited

U.S. PATENT DOCUMENTS

| | | | |
|---|---|---|---|
| 2016/0379089 A1* | 12/2016 | Cricri | G06K 9/3275 382/225 |
| 2018/0150951 A1* | 5/2018 | Chen | G01V 5/0008 |

FOREIGN PATENT DOCUMENTS

| | | |
|---|---|---|
| CN | 110599539 | 12/2019 |
| WO | 2014169273 | 10/2014 |

OTHER PUBLICATIONS

Leordeanu et al., A Spectral Technique for Correspondence Problems Using Pairwise Constraints, Proceedings of the Tenth IEEE International Conference on Computer Vision (ICCV'05), IEEE, 2005, 8 pages.
Fisher et al., A Comparison of Algorithms for Subpixel Peak Detection, retrieved from https://www.researchgate.net/publication/ 2401027, Sep. 2001, 25 pages.
Carsten Steger, An Unbiased Detector of Curvilinear Structures, IEEE Transactions on Pattern Analysis and Machine Intelligence, vol. 20, No. 2, Feb. 1998, 13 pages.
Shane Torbert, Applied Computer Science, Second Edition, Springer International Publishing, 2016, 291 pages.
Svoboda et al., Biometric Recognition of People by 3D Hand Geometry, Section II—International Workshop on Biomedical Technologies, IEEE, 2013, 5 pages.
Chen et al., Coded Structured Light Stripe Boundary Location with Sub-Pixel Accuracy Based on Weighted Centroid Method, Journal of Biological Systems, vol. 18 , Oct. 2010, 15 pages.
Yu et al., Dynamic 3-D Measurement Based on Fringe-To-Fringe Transformation Using Deep Learning, 2019, 16 pages.
Han et al., Indexing Coded Stripe Patterns Based on De Bruijn in Color Structured Light System, National Conference on Information Technology and Computer Science, Atlantis Press, 2012, 4 pages.
Brink et al., Indexing Uncoded Stripe Patterns in Structured Light Systems by Maximum Spanning Trees, doi:10.5244/C.22.57, 2008, 10 pages.
Robinson et al., Methods for Indexing Stripes in Uncoded Structured Light Scanning Systems, Jan. 2004, 8 pages.
Blais et al., Real-Time Numerical Peak Detector, Signal Processing 11, 1986, 11 pages.
Yang et al., Robust and Accurate Surface Measurement Using Structured Light, IEEE Transactions on Instrumentation and Measurement, vol. 57, No. 6, Jun. 2008, 7 pages.
China National Intellectual Property Administration, "First Notification of Office Action," issued in connection with Chinese Patent Application No. 202010268291.8, with English Translation, dated Oct. 29, 2021, 6 pages.
China National Intellectual Property Administration, "Search Report," issued in connection with Chinese Patent Application No. 202010268291.8, dated Oct. 29, 2021, with English Translation, 4 pages.
Zhang et al., "Optimization Method of Adaptive Center Extraction of Linear Structured Light Stripe," Applied Laser, vol. 39, No. 6, Dec. 2019, with English Abstract, 7 pages.

* cited by examiner

IMPLICIT STRUCTURED LIGHT DECODING METHOD, COMPUTER EQUIPMENT AND READABLE STORAGE MEDIUM

CROSS-REFERENCE TO RELATED APPLICATIONS

The present application claims the priority of a China application No. 202010268291.8, filed on Apr. 8, 2020 and entitled "Method and Apparatus For Decoding Implicit Structured Light", which is incorporated herein by reference.

TECHNICAL FIELD

The present disclosure relates to the field of decoding technologies, and in particular to, a implicit structured light decoding method, a computer equipment and a readable storage medium.

BACKGROUND

A projection type human-computer interaction technique generally relies on a projector and a camera to identify actions of human hand in its projected area, so as to achieve information interaction. A projection type human-computer interaction system utilizes persistence of vision of the human eyes, and adopts a projector to project high-speed (usually greater than 120 Hz) implicit structured light (which is a technique that simplifies a matching pixel search by projecting specific textures into a space to be measured, in which structured light is hidden in a parity frame of a projection interface), and the camera synchronously collects the parity frame interface image, then performs a difference operation on the parity frame image to acquire information of the structured light (that is, extraction of the projected textures), and finally uses this information to accurately measure positions of hands and fingertips and the positions of projection interface during the interaction in a real-time manner, thereby achieving an accurate judgment of touches of gestures and fingertips and an accurate judgment of the projection type human-computer interaction.

For the projection type human-computer interaction system, considering its requirement on real time, the system is unable to use time-coded structured light images, and is only able to use space-coded structured light images (the space-coded structured light refers to structured light in which a space array distribution mode in a light field is mathematically coded). In the space coding method, common color coding will make a projection interface flicker due to the time-sharing projection principle of the projector, and other coding methods will reduce the hidden effect due to complexity of patterns. Therefore, under the strict requirements of the implicit structured light technique itself, it is necessary to use a pattern as simple as possible for decoding, such as unidirectional stripes. However, such a simple pattern is difficult to decode accurately due to its information is less than general patterns.

Based on this, some methods of extracting stripes for structured light images have been proposed, which are usually carried out by the center of mass method (finding a center of mass of the gray distribution), the geometric center method (finding boundary points of a stripe, calculating a midpoint of the two points as a geometric center), the Gaussian fitting method (calculating an extreme point of a Gaussian curve fitting result) and the Steger algorithm (using an eigenvector to which an eigenvalue of a Hessian vector with a largest absolute value corresponds, giving normal directions of the points, and performing a second-order Taylor series expansion on grayscale distribution functions of pixel points of the stripe along the normal direction to obtain a stripe center). The existing center of gravity method and geometric center method only use a simple grayscale relationship, which are easily to be affected by the noises. The Gaussian fitting method uses the grayscale distribution characteristic of the stripe center, but the fitting is poor in robustness, and is very sensitive to noises. The Steger algorithm is robust, but flaws of the method itself lead to poor processing effect at stripe endpoints (there exist multiple noise points), and experiments show that the threshold calculation mode proposed in this method is not ideal in extracting stripes of implicit structured light with large noises, and a lot of stripes are lost. Therefore, these methods do not make a large difference in non-offset stripes with less noises, but for implicit stripes that are offset when being projected on an interacted hand, as reflection characteristics of human hand are different, a lot of noises will be introduced, which cause that the method has a relatively large error in extracting the implicit stripe centers, and result in a relatively large error in measurement of the positions of hands and fingertips, thereby affecting accuracy of the system in judging touches of the gestures and fingertips. Furthermore, the projection type human-computer system uses simple stripes as the structured light image, the stripes projected on a hand will be offset, or even misaligned as the height of the hand varies, and loss of stripes may also occur, resulting in a problem of difficulty in determining a correspondence between stripes with offset and stripes in the structured light image.

Therefore, there is currently no mature and robust solution for decoding such simple stripes.

SUMMARY

There are provided in embodiments of the present disclosure a implicit structured light decoding method, a computer equipment and a readable storage medium, which solve the technical problems in existing implicit structured light techniques that stripe extraction is poor in robustness and there exists no mature and efficient stripe pattern matching method.

There is provided in an embodiment of the present disclosure a implicit structured light decoding method, and the method comprises:

traversing a captured image to acquire a grayscale value of each pixel point, and constructing, according to the grayscale values of pixel points, an ideal neighborhood grayscale distribution of pixel points in a direction perpendicular to a stripe direction;

traversing the captured image, finding all stripe central points in the captured image according to the grayscale value of each pixel point and the ideal neighborhood grayscale distribution, and performing, whenever finding out each of the stripe central points, update the preset output image according to the found stripe central point and in combination with a preset output image;

classifying stripe central points in the updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

There is provided in an embodiment of the present disclosure a computer equipment, including a memory, a processor and a computer program stored in the memory and executed by the processor, and the processor executes the computer program to implement:

traversing a captured image to acquire a grayscale value of each pixel point, and constructing, according to the grayscale values of each pixel points, an ideal neighborhood grayscale distribution of each pixel points in a direction perpendicular to a stripe direction;

traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point and in combination with a preset output image;

classifying stripe central points in the updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

There is provided in an embodiment of the present disclosure a computer-readable storage medium storing a computer program which is used to execute:

traversing a captured image to acquire a grayscale value of each pixel point, and constructing, according to the grayscale values of each pixel points, an ideal neighborhood grayscale distribution of each pixel points in a direction perpendicular to a stripe direction;

traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point and in combination with a preset output image;

classifying stripe central points in the updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

In an embodiment, an ideal neighborhood grayscale distribution is established according to the grayscale distribution features of the stripe center point in the captured image. It is determined whether the current pixel point is the stripe center point based on the grayscale value of each pixel point in each row or column and the ideal neighborhood grayscale distribution in combination with the preset output image. All the stripes in the output image from which the stripes are extracted are classified; and the correspondence between stripes in the updated output image and stripes in a structured light image is determined according to the different stripes, and the stripe central points in the updated output image are decoded by using triangulation method in combination with the correspondence between stripes in the updated output image and stripes in the structured light image. Compared with state-of-the-art methods, the present disclosure takes the features of the stripe center points in a direction perpendicular to the stripes and in a direction of the stripe into account, which are more practical and robust than those of the existing methods. The present disclosure may efficiently and robustly decode implicit structured light images on a basis of ensuring accuracy.

BRIEF DESCRIPTION OF DRAWINGS

In order to clear explain the embodiments of the present disclosure and the technical solutions in existing techniques, drawings needed in the description of the embodiments or the existing techniques shall be described below in brief. Obviously, the drawings described below are some embodiments of the present disclosure only, and for those of ordinary skills in the art, other accompanying drawings may be obtained according to these accompanying drawings without making an inventive effort.

DESCRIPTION OF EMBODIMENTS

The technical solution in the embodiments of the present disclosure shall be clearly and completely described below with reference to the accompanying drawings in the embodiments of the present disclosure. It is obvious that these described embodiments are a part of the embodiments of the present disclosure only, rather than all of the embodiments of the present disclosure. All other embodiments obtained by those of ordinary skills in the art based on the embodiments of the present disclosure shall be covered by the protection scope of the present disclosure.

Figure 1:
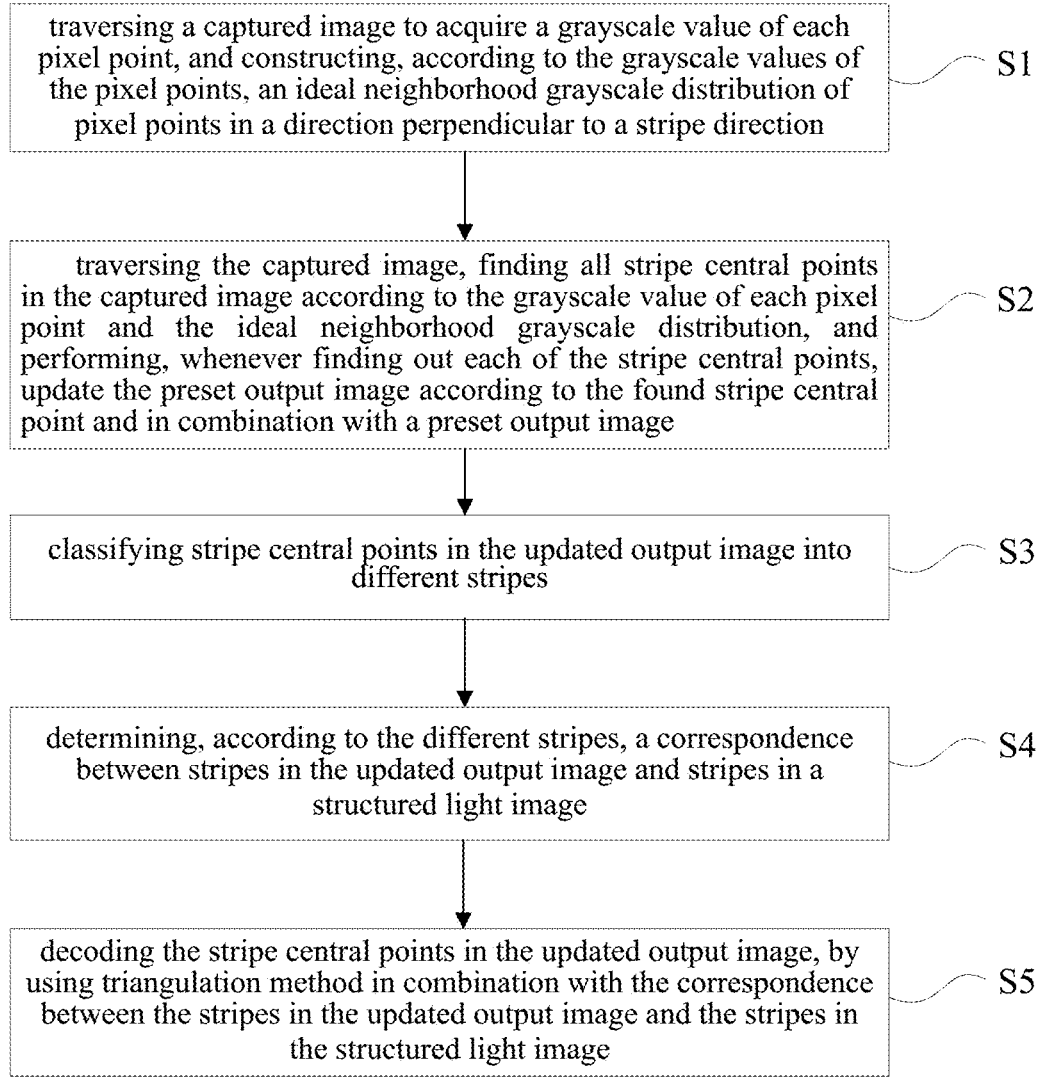
FIG. 1 is a flowchart of a implicit structured light decoding method provided in an embodiment of the present disclosure.

In an embodiment of the present disclosure, there is provided a implicit structured light decoding method. As shown in FIG. 1, the method includes:

S1: traversing an image $I_{raw}$ captured by a camera to acquire a grayscale value of each pixel point, and constructing, according to the grayscale values of pixel points, an ideal neighborhood grayscale distribution of pixel points in a direction perpendicular to a stripe direction; traversing an input image row by row when the input image is a horizontal stripe pattern, traversing an input image column by column when the input image is a longitudinal stripe pattern, and the number of rows or columns h at a first row or a first column being set to be h=1;

S2: traversing the captured image, finding all stripe central points in the captured image according to the grayscale value of each pixel point and the ideal neighborhood grayscale distribution, and performing, whenever finding out each of the stripe central points, update the preset output image according to the found stripe central point and in combination with a preset output image;

S3: classifying stripe central points in the updated output image into different stripes, that is, to obtain a plurality of stripes;

S4: determining, according to the different stripes, a correspondence between stripes in the updated output image and stripes in a structured light image; and S5: decoding the stripe central points in the updated output image, by using triangulation method in combination with the correspondence between the stripes in the updated output image and the stripes in the structured light image.

In the embodiments of the present disclosure, considering that an image sensor has a sampling fuzzy effect approximated to a Gaussian distribution and the captured image has a lot of noises, it is necessary to analyze features of the stripe center points and establish a probability model, so as to extract the stripe center points from an original image by searching a local maximum probability. An idea of constructing the probability model of the central points is shown as follows: assuming that a sequence of m points constituted by an ideal stripe center point $X_P$ and its neighborhood is $\{\ldots, X_{P-1}, X_P, X_{P+1}, \ldots\}$, the current pixel point is $x_i$ and a sequence of m points constituted by the current pixel point and its neighborhood is $\{\ldots, x_{i-1}, x_i, x_{i+1}, \ldots\}$; and if the current pixel point is the stripe central point, then the current pixel point should satisfy an one-to-one correspondence with a sequence constituted by the ideal stripe central point, which may be expressed as the following probability form:

$$P(x_i)=P(\ldots, x_{i-1}=X_{P-1}, x_i=X_P, x_{i+1}=X_{P+1}, \ldots);$$

According to a conditional probability formula, the above formula may be decomposed into two parts, $P(\ldots, x_{i-1}=X_{P-1}, x_i=X_P, x_{i+1}=X_{P+1}, \ldots | x_i=X_P)$ and $P(x_i=X_P)$, which may be constructed separately. It is considered in the embodiment of the present disclosure that the first term refers to a probability that points in a neighborhood of the current point $x_i$ have a one-to-one correspondence with points in an ideal central neighborhood under a condition that the current point $x_i$ is a central point, which may be expressed as a fit degree of ideal neighborhood grayscale distribution constructed by the current point and an actual distribution. Herein, there are many ways to construct the ideal grayscale distribution, such as the Gaussian distribution, etc., which may be as follows: when $x_i$ is the ideal stripe central point and corresponds to a grayscale value $y_i$, a grayscale value $y_{i+d}$ of a point $x_{i+d}$ having a distance d from $x_i$ satisfies the following relation:

$$y_{i+d} = y_i - \frac{4y_i}{W^2}d^2;$$

where, W denotes the stripe width. Considering that the greater a sum of errors between actual neighborhood grayscale distribution and the ideal distribution, the lower the fit degree, $P(\ldots, x_{i+1}=X_{P-1}, x_i=X_P, x_{i+1}=X_{P+1}, \ldots | x_i=X_P)$ may be constructed in a way as below:

$$P\left(\ldots, x_{i-1} = X_{P-1}, x_i = X_P, x_{i+1} = X_{P+1}, \ldots | x_i = X_P\right) = \exp\left(-\sum_{k=i-1}^{i-m}\left|y_i - y_{i-k} - \frac{4y_i}{W^2}k^2\right|\right).$$

This item takes a probability that the current point $x_i$ is a central point in the direction perpendicular to the stripes into account. Next, the embodiment of the present disclosure uses the second term $P(x_i=X_P)$ to take the probability of the current point which is in the direction parallel to the stripe. Assuming that coordinates of the current point $x_i$ is $(a,h_i)$, and it is known that coordinates of a central point extracted from an (a−1)-th row in $I_{extract}$ are $(a-1, h_{prev})$, it may be considered according to continuity of horizontal stripes that a probability that the point $x_i$ is the stripe central point satisfies a Gaussian distribution with parameter $$(h_{prev}, \sigma^2), \text{i.e. } P(x_i = X_P) = \frac{1}{\sqrt{2\pi\sigma^2}}\exp\left(-\frac{(h_i - h_{prev})^2}{2\sigma^2}\right).$$

It should be noted that for special cases, such as a case where there is no previous extraction result in an initial search, when $h_i - h_{prev} > W/2$ or when a distance between the current point and the previous extraction result on the abscissa is greater than one pixel, it is considered that the continuity probabilities of stripes in neighborhood of this point are identical. As the search for the stripe central points is based on a local-maximum probability value, this item does not affect the probability distribution in the neighborhood at this time, hence, it is no longer considered. Summarizing the above analysis, the following formula may be obtained as an optimization function in the stripe extraction process. The value to which each point in the image corresponds is calculated and the position of local maximum probability value $P_{x_i}$ is found, so as to obtain the position of the stripe central point.

$$\max P_{x_i} = \max \log P(x_i) = -\sum_{k=i-1}^{i-m}\left|y_i - y_{i-k} - \frac{4y_i}{W^2}k^2\right| - \frac{(h_i - h_{prev})^2}{2\sigma^2}.$$

Based on the above analysis, said constructing, according to the grayscale value of each pixel point, the ideal neighborhood grayscale distribution of pixel points in the direction perpendicular to a stripe direction in step S1 includes:

comparing the grayscale value of pixel points with a preset threshold, and constructing the ideal neighborhood grayscale distribution in the direction perpendicular to the stripe direction for the pixel point having the grayscale value greater than the preset threshold $y_{th}$. Such an operation may eliminate the interference of background pixel points and reduce the amount of calculation.

Figure 2:
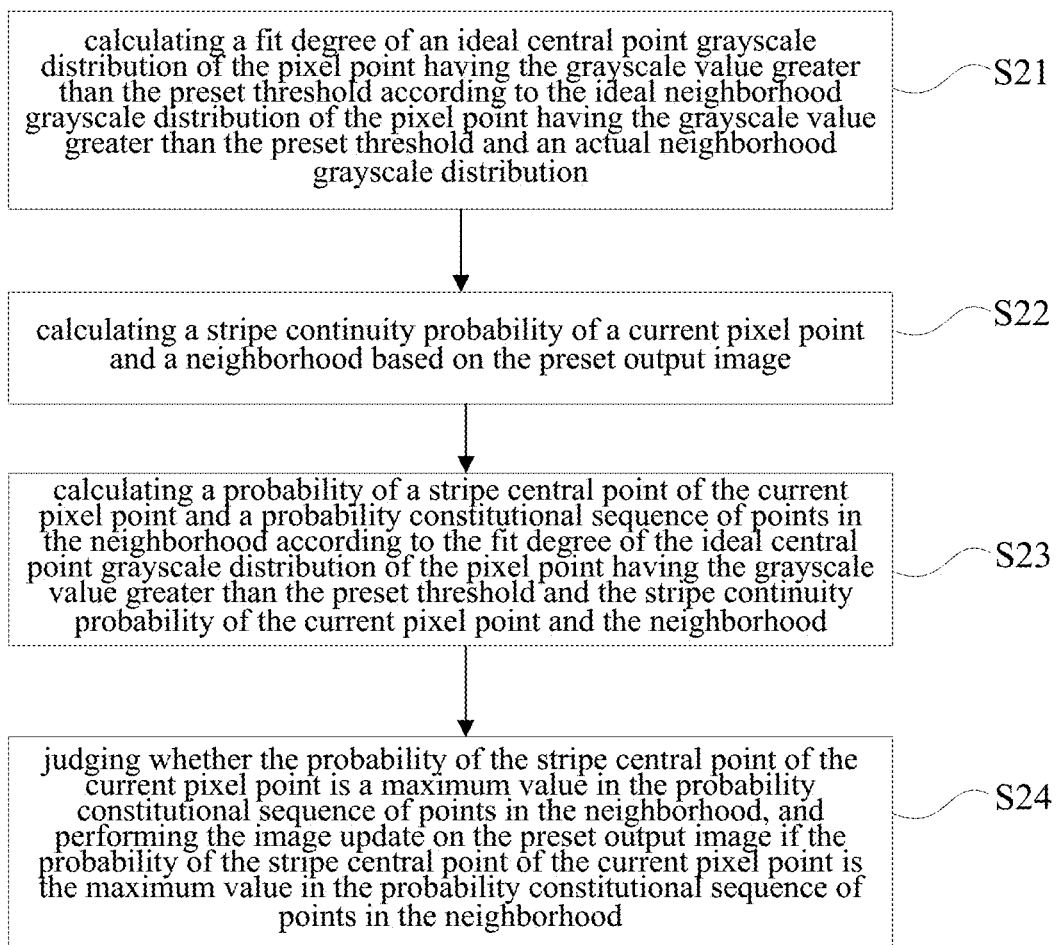
FIG. 2 is a partial process for updating an output image provided in an embodiment of the present disclosure.

As shown in FIG. 2, said judging whether the current pixel point is a stripe central point according to the grayscale value of each pixel point and the ideal neighborhood grayscale distribution and in combination with a preset output image, and if the current pixel point is a stripe central point, update the preset output image according to the current pixel point in step S2, includes:

Step S21: calculating a fit degree of an ideal central point grayscale distribution of the pixel point having the grayscale value greater than the preset threshold by using $$-\sum_{k=i-1}^{i-m}\left|y_i - y_{i-k} - \frac{4y_i}{W^2}k^2\right|$$

according to the ideal neighborhood grayscale distribution of the pixel point having the grayscale value greater than the preset threshold and an actual neighborhood grayscale distribution;

Step S22: calculating the stripe continuity probability of the current pixel point and the neighborhood by using $$-\frac{(h_i - h_{prev})^2}{2\sigma^2}$$

based on the preset output image $I_{extract}$;

Step S23: calculating a probability $P_{x_i}$ of a stripe central point of the current pixel point $x_i$ and a probability constitutional sequence $\{P_{x_{i-k}}\}$ of points in the neighborhood according to the fit degree of the ideal central point grayscale distribution of the pixel point having the grayscale value greater than the preset threshold and the stripe continuity probability of the current pixel point and the neighborhood; where k=i−1, i−2, . . . , i−m, m, and m is a total width of the neighborhood; and Step S24: judging whether the probability $P_{x_i}$ of the stripe central point of the current pixel point $x_i$ is a maximum value in the probability constitutional sequence $\{P_{x_{i-k}}\}$ of points in the neighborhood, and performing the image update on the preset output image if the probability of the stripe central point of the current pixel point is the maximum value in the probability constitutional sequence of points in the neighborhood. For example, a grayscale value to which a position of the point $x_i$ in the output image $I_{extract}$ corresponds is recorded as 0, and grayscale values of pixels in its neighborhood position is recorded as 255. Noise points near stripes that are previously found may be eliminated by updating grayscale values in the neighborhood range of the central point that is currently found.

Figure 3:
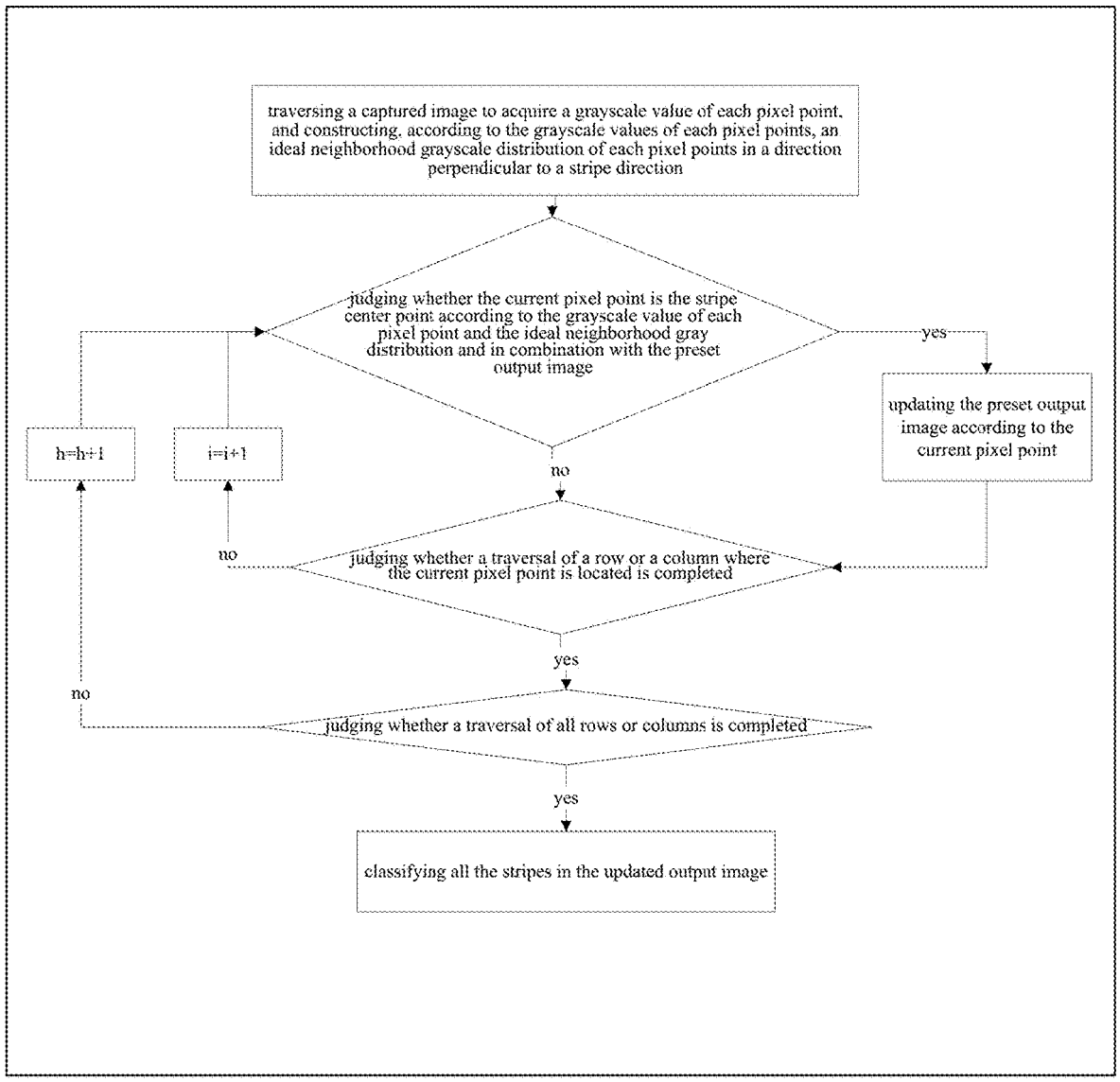
FIG. 3 is a flowchart of judging whether it is a stripe center point provided in an embodiment of the present disclosure.

Specifically, as shown in FIG. 3, the pixel points are traversed and judged according to the following process:

judging whether the current pixel point is the stripe center point according to the grayscale value of each pixel point in each row (or column) and the ideal neighborhood grayscale distribution and in combination with the preset output image $I_{extract}$; if it is judged that the current pixel point is a stripe central point, updating the preset output image $I_{extract}$ according to the current pixel point, and if it is judged that the current pixel point is not a stripe central point, judging whether a traversal of a row (or column) where the current pixel point is located is completed; if the traversal of a row (or column) where the current pixel point is located is not completed, let i=i+1 and return to step S22 to start processing a next point, if the traversal of a row (or column) where the current pixel point is located is completed, judging whether a traversal of all rows (or columns) is completed, if the traversal of all the rows (or columns) is not completed, judging pixel points of a next row (or column) (h=h+1) to determine whether the pixel points of the next row (or column) are stripe central points, and if the traversal of all the rows (or columns) is completed, performing an stripe extraction and outputting the updated output image. Herein, grayscale values of all pixel points in the preset output image are 0 (all black) or 255 (all white), and the updated output image includes all extracted stripe central points; $x_i$ is the i-th pixel in each row, a range of i is from 1 to the sum of pixels in each row, and the sum of pixels in each row is determined according to an actual image.

Figure 4:
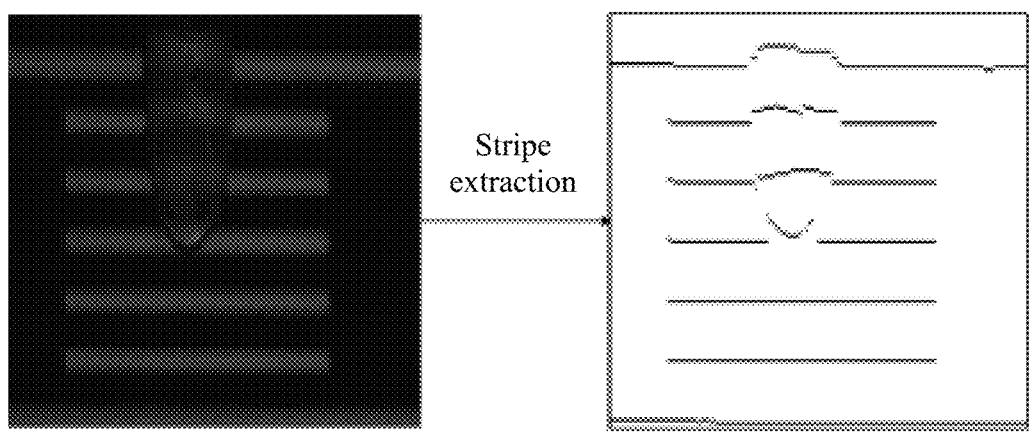
FIG. 4 is a diagram of an effect of a stripe extraction provided in an embodiment of the present disclosure.

FIG. 4 is an effect graph of a stripe extraction. It can be seen from FIG. 4 that stripe central points on the projection plane and the finger are extracted relatively completely, and the extracted stripe central points have a relatively good continuity. The image $I_{extract}$ after the extraction will be used in steps S3-S5 for decoding all the extracted points.

Figure 5:
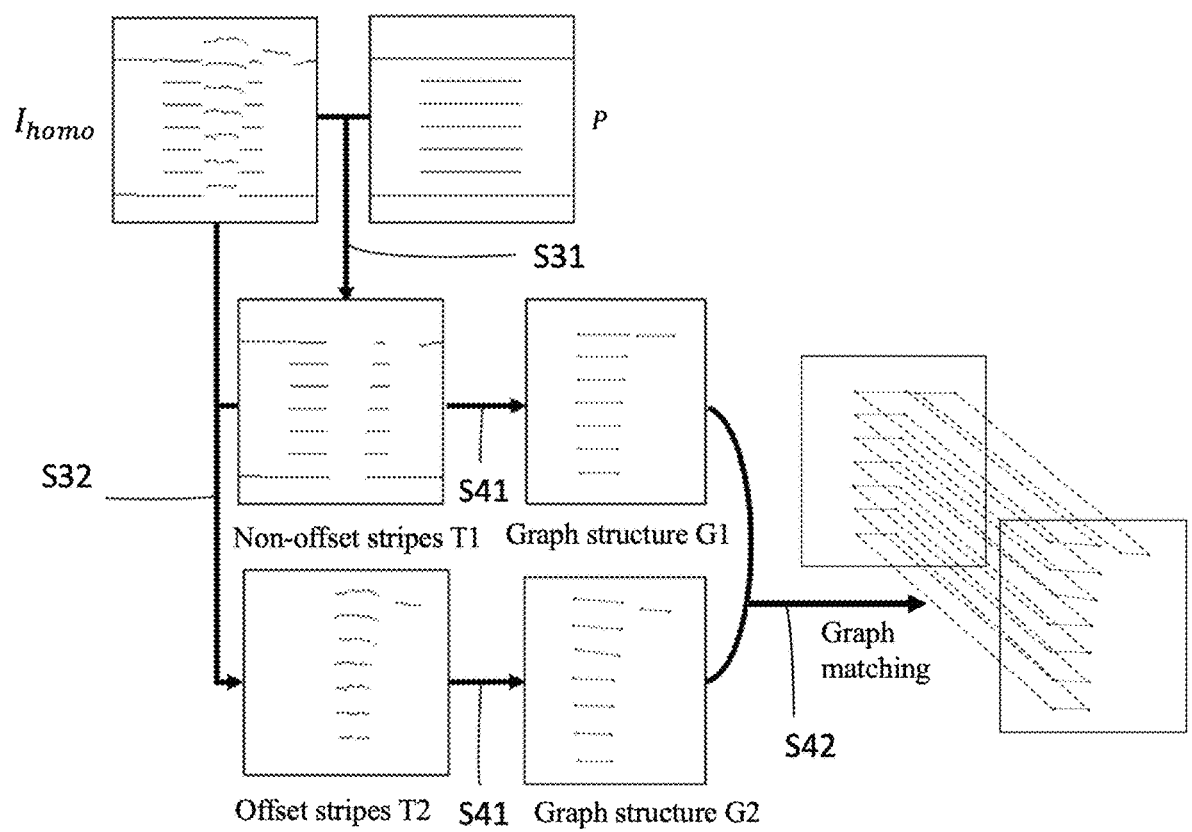
FIG. 5 is a flowchart of classifying and matching output images provided in an embodiment of the present disclosure.

In the embodiments of the present disclosure, when determining a correspondence between the stripes of the captured image and the stripes of the structured light image, the homography transformed stripes completely corresponding to the structured light image under an ideal situation, hence the structured light image P may be taken as a template, the homography transformation result $I_{homo}$ in step S3 is used to find stripes completely corresponding to P (i.e. non-offset stripes) and stripes not corresponding P (i.e. stripes with offset), and the structural similarity of them is used to determine the stripe correspondence. This flow (i.e., the above steps S3 and S4) is shown in FIG. 5.

Step S3 includes:

Step S31: performing the homography transformation on the updated output image to output a homography transformed image;

wherein the homography transformation describes a position mapping relationship between the pixel coordinate system of the camera and the pixel coordinate system of the projector; parameters of the homography matrix are obtained in calibrating the camera and the projector. The process of homography transformation is to multiply a position of each pixel in the image captured by the camera by the homography matrix to obtain the corresponding position of the pixel on the projection pattern. When there is no blocking by hand or other objects, the result of the positions of the stripe central points in the image captured by the camera will be completely the same as the stripe distribution in the projection pattern after the homography transformation.

Step S32: finding the set U1 of non-offset stripe central points from the homography transformed image $I_{homo}$ based on the structured light image P, and determining the set T1 of non-offset stripes (that is, the stripes are constituted by connecting the stripe central points) according to U1; obtaining the set U2 of stripes with offset central points by subtracting U1 from the set of all stripe central points in $I_{homo}$; and classifying the set U2 of stripes with offset central points by using the FloodFill algorithm to obtain the set T2 of classified stripes with offset.

Due to the occurrence of the offset, fractures occur at corresponding positions of the non-offset stripes, and at the same time, new stripes are constituted, hence, in an ideal situation, graph structures formed at positions of the fractures should be identical to structure of the stripes with offset. In this embodiment, such a structural similarity is used to perform the graph matching to achieve stripe matching, that is, step S4 includes:

Step S41: finding a breakpoint of a stripe from the set T1 of stripes without an offset, and constructing a bipartite graph structure G1 of non-offset stripes according to the breakpoints (e.g., two breakpoints construct a stripe, and four breakpoints construct two stripes); finding the end points from the set T2 of classified stripes with offset, and constructing a bipartite graph structure G2 of stripes with offset according to the end points; and Step S42: matching the bipartite graph structure G1 with the bipartite graph structure G2 by using a graph matching algorithm to obtain the correspondence between stripes with offset and non-offset stripes.

Preferably, there are lots of graph matching methods that can be used in step S42, such as based on the principle of spectral decomposition, based on the principle of random walk, etc. Considering the difference in calculation complexity of these algorithms, the present invention uses the graph matching algorithm based on the spectral decomposition principle for calculation.

Figure 6:
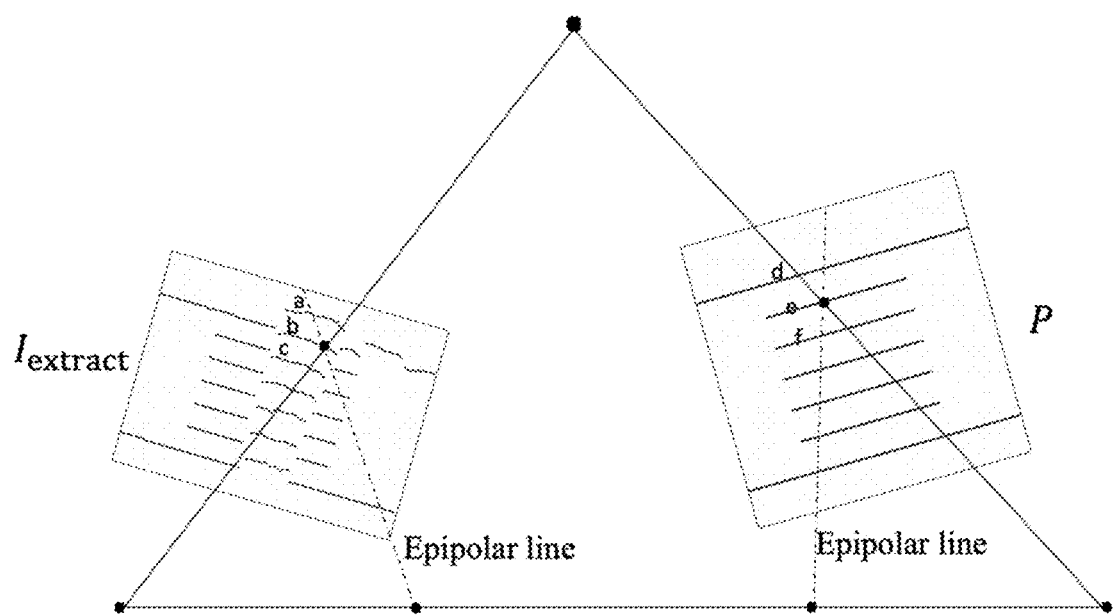
FIG. 6 is a schematic diagram of a decoding principle using a corresponding stripe and epipolar constraints provided in an embodiment of the present disclosure.
Figure 7:
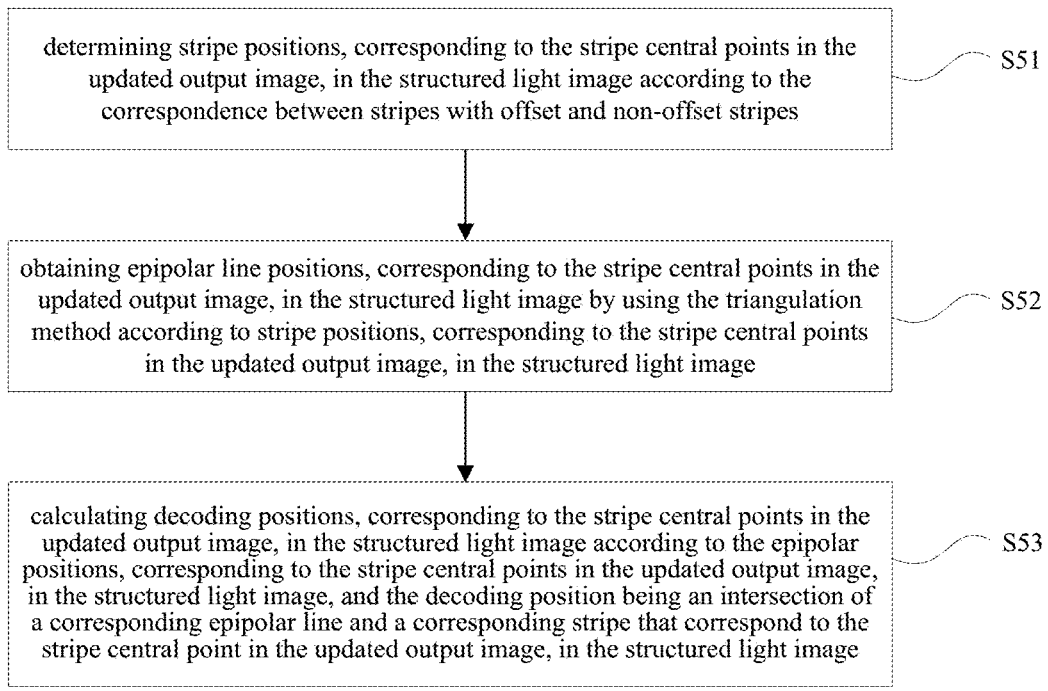
FIG. 7 is a flowchart of a decoding method using a corresponding stripe and epipolar constraints provided in an embodiment of the present disclosure.

In the embodiments of the present invention, all the stripe central points are decoded based on the stripe matching result of the above steps in combination with the epipolar information. As shown in FIG. 6, it is a schematic diagram of a decoding principle by using corresponding stripes and an epipolar constraint. For a point in a stripe b in $I_{extract}$, the corresponding epipolar position (such as the position shown by dotted lines in the structured light image P at the right side) of this point in the structured light image are calculated according to the epipolar constraint principle, and the epipolar line has intersections with the stripes def etc. If there is no correspondence between the stripes, it is difficult to determine corresponding points of the points in $I_{extract}$ in the structured light image. According to the stripe matching relationship obtained by step S42, the position of the stripe e in the structured light image P to which the stripe b in $I_{extract}$ corresponds is known, and the decoding of this point is performed by solving the intersection of the stripe e and the epipolar line. That is, as shown in FIG. 7, step S5 includes:

Step S51: determining stripe positions, corresponding to the stripe central points in the updated output image $I_{extract}$ in the structured light image P according to the correspondence between stripes with offset and non-offset stripes;

Step S52: obtaining epipolar line positions, corresponding to the stripe central points in the updated output image $I_{extract}$, in the structured light image P by using the triangulation method according to stripe positions, corresponding to the stripe central points in the updated output image $I_{extract}$ in the structured light image P; and Step S53: calculating decoding positions, corresponding to the stripe central points in the updated output image $I_{extract}$ in the structured light image P according to the epipolar positions, corresponding to the stripe central points in the updated output image $I_{extract}$, in the structured light image P, and the decoding position being an intersection of a corresponding epipolar line and a corresponding stripe that correspond to the stripe central point in the updated output image $I_{extract}$, in the structured light image P.

The embodiments of the present disclosure further include:

acquiring point cloud data of all the stripe central points according to the decoded output image in combination with intrinsic and extrinsic parameters of a camera and a projector, establishing a point cloud model of a gesture and a fingertip in a three-dimensional space according to the point cloud data of all the stripe central points, and judging touches of the gesture and the fingertip according to the point cloud model.

Herein, the intrinsic parameters include a focal length, coordinates of a principal point, and distortion parameters of the camera or the projector, which are intrinsic inherent parameters of the camera or the projector. The extrinsic parameters describe a pose of the camera or projector in world coordinate system, and include a rotation matrix and a translation vector. The world coordinate system is a three-dimensional coordinate system set by the user before use. With the intrinsic and extrinsic parameters of the camera and the projector, positions of all the stripe central points in the world coordinate system may be calculated, thereby forming a point cloud.

This solution is also applicable to a case where an input image is a projected visible structured light pattern.

An embodiment of the present disclosure provides a computer equipment, which may be a desktop computer, a tablet computer, and a mobile terminal, etc., and this embodiment is not limited thereto. In this embodiment, the computer equipment may implement the implicit structured light decoding method.

Figure 8:
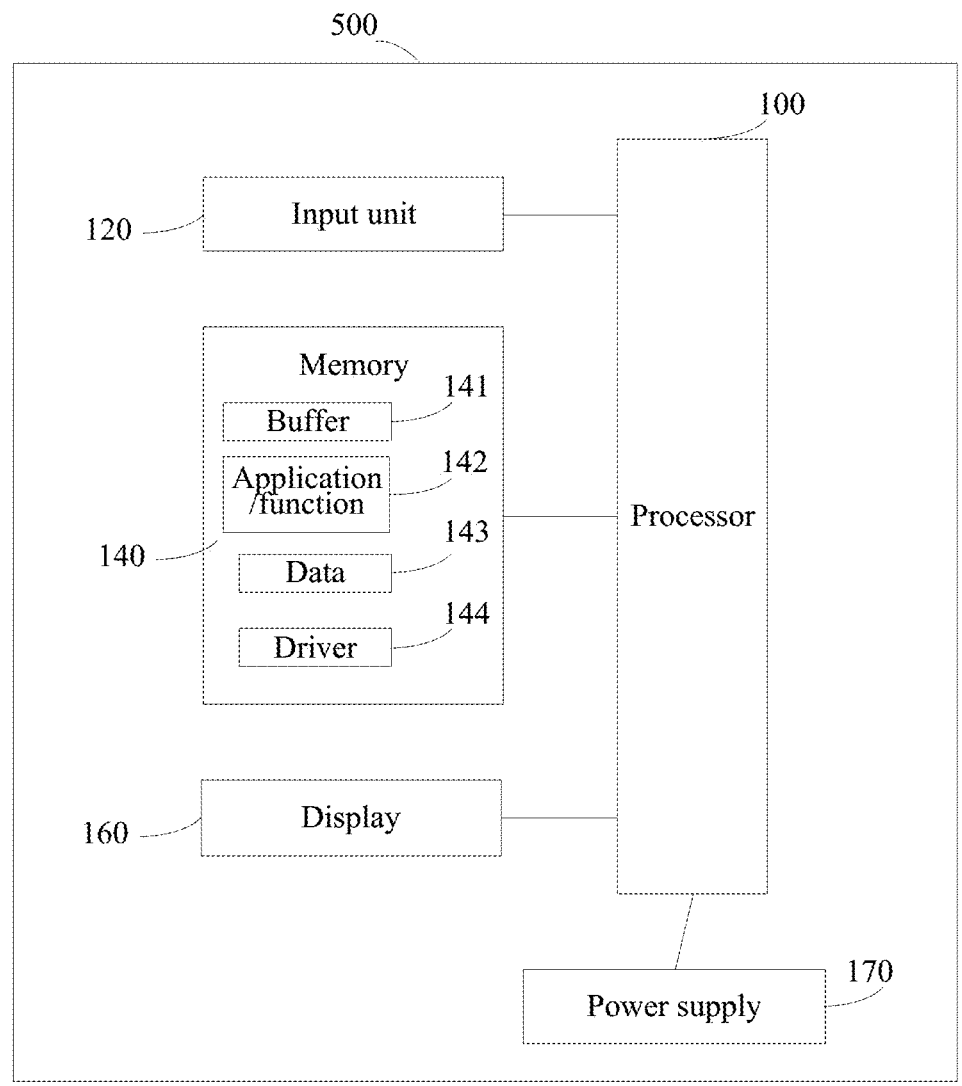
FIG. 8 is a block diagram of a system configuration of the computer equipment provided in an embodiment of the present disclosure.

FIG. 8 is a block diagram of a system configuration of a computer equipment 500 of the embodiment of the present disclosure. As show in FIG. 8, the computer equipment 500 may include a processor 100 and a memory 140, and the memory 140 is coupled to the processor 100. It should be noted that this figure is illustrative only, and other types of structures may also be used to supplement or replace this structure, so as to achieve a telecommunications function or other functions.

In an implementation, decoding functions of the implicit structured light may be integrated into the processor 100. Herein, the processor 100 may be configured to perform the following controls:

traversing a captured image to acquire a grayscale value of each pixel point, and constructing, according to the grayscale values of pixel points, an ideal neighborhood grayscale distribution of pixel points in a direction perpendicular to a stripe direction;

traversing the captured image, finding all stripe central points in the captured image according to the grayscale value of each pixel point and the ideal neighborhood grayscale distribution, and performing, whenever finding out each of the stripe central points, update the preset output image according to the found stripe central point and in combination with a preset output image;

classifying stripe central points in the updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

Herein, the processor executes the computer program to implement the following acts of:

comparing the grayscale value of the pixel point with a preset threshold, and constructing the ideal neighborhood grayscale distribution in the direction perpendicular to the stripe direction for the pixel point having the grayscale value greater than the preset threshold.

Herein, the processor executes the computer program to implement the following acts of:

constructing the ideal neighborhood grayscale distribution in the direction perpendicular to the stripe direction according to a formula as below:

$$y_{i+d} = y_i - \frac{4y_i}{W^2}d^2;$$

where, $y_i$ is a grayscale value to which an ideal stripe central point $x_i$ corresponds, $y_{i+d}$ is a grayscale value of a point $x_{i+d}$ having a distance d from $x_i$ and W denotes a stripe width.

Herein, the processor executes the computer program to implement the following acts of:

calculating a fit degree of an ideal central point grayscale distribution of the pixel point having the grayscale value greater than the preset threshold according to the ideal neighborhood grayscale distribution of the pixel point having the grayscale value greater than the preset threshold and an actual neighborhood grayscale distribution;

calculating the stripe continuity probability of the current pixel point and a neighborhood based on the preset output image;

calculating a probability of a stripe central point of the current pixel point and a probability constitutional sequence of points in the neighborhood according to the fit degree of the ideal central point grayscale distribution of the pixel point having the grayscale value greater than the preset threshold and the stripe continuity probability of the current pixel point and the neighborhood; and judging whether the probability of the stripe central point of the current pixel point is a maximum value in the probability constitutional sequence of points in the neighborhood, and performing the image update on the preset output image if the probability of the stripe central point of the current pixel point is the maximum value in the probability constitutional sequence of points in the neighborhood.

Herein, the processor executes the computer program to implement the following acts:

said traversing is traversing row by row, or traversing column by column; and if it is judged that the current pixel point is not the stripe central point, judging whether a traversal of a row or a column where the current pixel point is located is completed; if the traversal of the row or the column where the current pixel point is located is not completed, further judging whether a pixel point next to the current pixel point is a stripe central point according to a grayscale value of the pixel point next to the current pixel point and a grayscale distribution of points in a neighborhood of the pixel point next to the current pixel point and in combination with the updated output image; and if the traversal of the row or the column where the current pixel point is located is completed, judging whether a traversal of all rows or columns is completed, if the traversal of all the rows or columns is not completed, judging pixel points of a next row or column to determine whether the pixel points of the next row or column are stripe central points, and if the traversal of all rows or columns is completed, performing an stripe extraction and outputting the updated output image.

Herein, the processor executes the computer program to implement the following acts of:

performing a homography transformation on the updated output image to output a homography transformed image;

finding a set of stripe central points without an offset from the homography transformed image based on the structured light image, and determining a set of stripes without an offset according to the set of stripe central points without an offset;

determining a set of stripe central points with an offset according to the set of stripe central points without an offset; and classifying the set of stripe central points with an offset by using the FloodFill algorithm to obtain a set of classified stripes with an offset.

Herein, the processor executes the computer program to implement the following acts of:

finding a breakpoint of a stripe from the set of stripes without an offset, and constructing a bipartite graph structure of the stripes without an offset according to the breakpoint;

finding an end point of a stripe from the set of classified stripes with an offset, and constructing a bipartite graph structure of the stripes with an offset according to the end point; and matching the bipartite graph structure of stripes without an offset with the bipartite graph structure of stripes with an offset by using a graph matching algorithm to obtain a correspondence between stripes with offset and non-offset stripes.

Herein, the processor executes the computer program to implement the following acts of:

determining stripe positions, corresponding to the stripe central points in the updated output image, in the structured light image according to the correspondence between stripes with offset and non-offset stripes;

obtaining epipolar line positions, corresponding to the stripe central points in the updated output image, in the structured light image by using the triangulation method according to stripe positions, corresponding to the stripe central points in the updated output image, in the structured light image; and calculating decoding positions, corresponding to the stripe central points in the updated output image, in the structured light image according to the epipolar positions, corresponding to the stripe central points in the updated output image, in the structured light image, and the decoding position being an intersection of a corresponding epipolar line and a corresponding stripe that correspond to the stripe central point in the updated output image, in the structured light image.

Herein, the processor executes the computer program to implement the following acts of:

acquiring point cloud data of all the stripe central points according to the decoded output image in combination with intrinsic and extrinsic parameters of a camera and a projector, establishing a point cloud model of a gesture and a fingertip in a three-dimensional space according to the point cloud data of all the stripe central points, and judging touches of the gesture and the fingertip according to the point cloud model.

In another implementation, the decoding functions of the implicit structured light and the processor 100 may be configured separately; for example, the decoding functions of the implicit structured light may be configured in a chip connected to the processor 100, and the decoding functions of the implicit structured light are executed under the control of the processor.

As shown in FIG. 8, the computer equipment 500 may further include an input unit 120, a display 160, and a power supply 170. It should be noted that the computer equipment 500 does not necessarily include all the parts shown in FIG. 8, and furthermore, the computer equipment 500 may include parts not shown in FIG. 8, and reference may be made to the prior art.

Herein, the processor 100 is sometimes referred to as a controller or an operation control, which may include a microprocessor or other processor apparatus and/or logic apparatus, and the processor 100 receives input and controls operations of each component of the computer equipment 500.

The input unit 120 provides an input to the processor 100. The input unit 120 is, for example, a button or touch input device.

The memory 140 may be, for example, one or more of a buffer memory, a flash memory, a hard drive, a mobile medium, a volatile memory, a nonvolatile memory, or other suitable devices, which may store programs for executing related information. And the processor 100 may execute programs stored in the memory 140, so as to realize information storage or processing, etc.

The memory 140 may be a solid-state memory, such as a read only memory (ROM), a random access memory (RAM), and a SIM card, etc. It may also be a memory that saves information even when the power is turned off, and can be selectively erased and provided with more data, and an example of this memory is sometimes referred to as an EPROM, or the like. The memory 140 may also be a apparatus of another type. The memory 140 includes a buffer memory 141 (sometimes referred to as a buffer). The memory 140 may include an application/function storage portion 142 for storing applications and function programs or a flow for performing operations of an electronic device by the processor 100.

The memory 140 may further include a data storage portion 143 for storing data, such as contacts, digital data, pictures, sounds, and/or any other data used by an electronic device. A driver storage portion 144 of the memory 140 may include various drivers of the electronic device for communications functions and/or for performing other functions of the electronic device (such as messaging applications, address book applications, etc.).

The display 160 is used for displaying display objects such as images and characters, etc. The display may be, for example, an LCD display; however, it is not limited thereto.

The power supply 170 is used to provide power to the computer equipment 500.

An embodiment of the present disclosure provides a computer-readable storage medium storing a computer program, and the computer program is used to execute:

traversing a captured image to acquire a grayscale value of each pixel point, and constructing, according to the grayscale values of pixel points, an ideal neighborhood grayscale distribution of pixel points in a direction perpendicular to a stripe direction;

traversing the captured image, finding all stripe central points in the captured image according to the grayscale value of each pixel point and the ideal neighborhood grayscale distribution, and performing, whenever finding out each of the stripe central points, update the preset output image according to the found stripe central point and in combination with a preset output image;

classifying stripe central points in the updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

The computer-readable storage medium may include a physical apparatus used for storing information which may be stored in the media of electronic, magnetic or optical manners after being digitized. The computer-readable storage medium of this embodiment may include: an apparatus storing information in an electric power manner, such as various types of memories, e.g. an RAM, and an ROM, etc.; an apparatus storing information in a magnetic power manner, such as a hard disk, a floppy disk, a magnetic tape, a magnetic-core memory, a bubble memory, and a USB flash disk; and an apparatus storing information in an optical manner, such as a CD, or a DVD, etc. Of course, there may be readable memory media in other manners, such as a quantum memory, and a graphene memory, etc.

In summary, the implicit structured light decoding method, the computer equipment and the readable storage medium proposed in the present disclosure have the following advantages:

A probability model is established by using the grayscale distribution features of the stripe central points in the captured image. The model takes the features of the stripe central points in a direction perpendicular to the stripes and along the direction of the stripes into account at the same time, which is more practical and robust than the previous methods. Furthermore, the similarity between the graph structure formed by the breakpoints of the non-offset stripes and the graph structure formed by the breakpoints of the stripes with offset is used in the present disclosure to perform fast and accurate decoding, which promotes the development and application of such a special technique, i.e., the implicit structured light in a stereo vision system. It solves the problems that the current implicit structured light technology has poor robustness in stripe extraction and there is no mature and efficient stripe pattern matching method.

Those skilled in the art should appreciate that embodiments of the present disclosure may be provided as a method, a system, or a computer program product. Therefore, the embodiments of the present disclosure can take the form of a full hardware embodiment, a full software embodiment or an embodiment containing both hardware and software elements. Moreover, the present disclosure can be in a form of one or more computer program products containing the computer-executable codes which can be implemented in the computer-executable non-transitory storage media (including but not limited to disk memory, CD-ROM, optical memory, etc.).

The present disclosure is described with reference to the flow charts and/or block diagrams of the method, device (system) and computer program product according to the embodiments of the present disclosure. It shall be understood that each flow and/or block in the flowcharts and/or block diagrams and a combination of the flows and/or blocks in the flowcharts and/or block diagrams can be implemented by computer program instructions. These computer program instructions can be provided to a general purpose computer, a special purpose computer, an embedded processor, or a processor of other programmable data processing devices so as to generate a machine for generating means for implementing the functions of one or more flows of a flowchart and/or one or more blocks of a block diagram by using the instructions executed by the computer or the processor of other programmable data processing devices.

These computer program instructions can also be stored in a computer readable memory guiding the computer or other programmable data processing devices to work in a particular way, such that the instructions stored in the computer readable memory generate an article of manufacture containing instruction means which implements the functions of one or more flows of a flowchart and/or one or more blocks in a block diagram.

These computer program instructions can also be loaded onto a computer or other programmable data processing devices such that a series of operational steps are performed on a computer or other programmable devices to produce computer-implemented processing, so that the instructions executed on a computer or other programmable devices provide steps for implementing the functions of one or more flows of a flowchart and/or one or more blocks of a block diagram.

The above content is only preferred embodiments of this present disclosure, but cannot be used for limiting the present disclosure. Any modification, equivalent replacement and improvement, etc. within the spirit and principle of the present disclosure shall be contained in the scope of protection of the present disclosure.

What is claimed is:

1. A implicit structured light decoding method, comprising:

traversing a captured image to acquire a grayscale value of each pixel point, and constructing, according to the grayscale values of the pixel points, an ideal neighborhood grayscale distribution of pixel points in a direction perpendicular to a stripe direction;

traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point;

classifying stripe central points in an updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

2. The implicit structured light decoding method according to claim 1, wherein said constructing, according to the grayscale value of each pixel point, an ideal neighborhood grayscale distribution of pixel points in a direction perpendicular to a stripe direction comprises:

comparing the grayscale value of the pixel point with a preset threshold, and constructing the ideal neighborhood grayscale distribution in the direction perpendicular to the stripe direction for the pixel point having the grayscale value greater than the preset threshold.

3. The implicit structured light decoding method according to claim 2, wherein the ideal neighborhood grayscale distribution in the direction perpendicular to the stripe direction is constructed according to a formula as below:

$$y_{i+d} = y_i - \frac{4y_i}{W^2} d^2;$$

where, $y_i$ is a grayscale value to which an ideal stripe central point $x_i$ corresponds, $y_{i+d}$ is a grayscale value of a point $x_{i+d}$ having a distance d from $x_i$, and W denotes a stripe width.

4. The implicit structured light decoding method according to claim 2, said traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point comprises:

calculating a fit degree of an ideal central point grayscale distribution of the pixel point having the grayscale value greater than the preset threshold according to the ideal neighborhood grayscale distribution of the pixel point having the grayscale value greater than the preset threshold and an actual neighborhood grayscale distribution;

calculating a stripe continuity probability of a current pixel point and a neighborhood based on the preset output image;

calculating a probability of a stripe central point of the current pixel point and a probability constitutional sequence of points in the neighborhood according to the fit degree of the ideal central point grayscale distribution of the pixel point having the grayscale value greater than the preset threshold and the stripe continuity probability of the current pixel point and the neighborhood; and judging whether the probability of the stripe central point of the current pixel point is a maximum value in the probability constitutional sequence of points in the neighborhood, and performing the image update on the preset output image if the probability of the stripe central point of the current pixel point is the maximum value in the probability constitutional sequence of points in the neighborhood.

5. The implicit structured light decoding method according to claim 4, said traversing is traversing row by row, or traversing column by column; and said traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point further comprises:

if it is judged that the current pixel point is not the stripe central point, judging whether a traversal of a row or a column where the current pixel point is located is completed; if the traversal of the row or the column where the current pixel point is located is not completed, further judging whether a pixel point next to the current pixel point is a stripe central point according to a grayscale value of the pixel point next to the current pixel point and a grayscale distribution of points in a neighborhood of the pixel point next to the current pixel point and in combination with the updated output image; and if the traversal of the row or the column where the current pixel point is located is completed, judging whether a traversal of all rows or columns is completed, if the traversal of all the rows or columns is not completed, judging pixel points of a next row or column to determine whether the pixel points of the next row or column are stripe central points, and if the traversal of all rows or columns is completed, performing a stripe extraction and outputting the updated output image.

6. The implicit structured light decoding method according to claim 1, wherein said classifying stripe central points in a updated output image into different stripes comprises:

performing the homography transformation on the updated output image to output a homography transformed image;

finding the set of non-offset stripe central points from the homography transformed image based on the structured light image, and determining the set of non-offset stripes according to the set of non-offset stripe central points;

determining a set of stripes with offset central points with an offset according to the set of non-offset stripe central points; and classifying the set of stripes with offset central points by using the FloodFill algorithm to obtain a set of classified stripes with offset.

7. The implicit structured light decoding method according to claim 6, wherein said determining, according to the different stripes, a correspondence between stripes in the updated output image and stripes in a structured light image comprises:

finding a breakpoint of a stripe from the set of non-offset stripes, and constructing a bipartite graph structure of the non-offset stripes according to the breakpoint;

finding an end point of a stripe from the set of classified non-offset stripes, and constructing a bipartite graph structure of the stripes with offset according to the end point; and matching the bipartite graph structure of non-offset stripes with the bipartite graph structure of stripes with offset by using a graph matching algorithm to obtain a correspondence between stripes with offset and non-offset stripes.

8. The implicit structured light decoding method according to claim 7, wherein said decoding the stripe central points in the updated output image, by using triangulation method in combination with the correspondence between the stripes in the updated output image and the stripes in the structured light image comprises:

determining stripe positions, corresponding to the stripe central points in the updated output image, in the structured light image according to the correspondence between stripes with offset and non-offset stripes;

obtaining epipolar line positions, corresponding to the stripe central points in the updated output image, in the structured light image by using the triangulation method according to stripe positions, corresponding to the stripe central points in the updated output image, in the structured light image; and calculating decoding positions, corresponding to the stripe central points in the updated output image, in the structured light image according to the epipolar positions, corresponding to the stripe central points in the updated output image, in the structured light image, and the decoding position being an intersection of a corresponding epipolar line and a corresponding stripe that correspond to the stripe central point in the updated output image, in the structured light image.

9. The implicit structured light decoding method according to claim 1, further comprising:

acquiring point cloud data of all the stripe central points according to the decoded output image in combination with intrinsic and extrinsic parameters of a camera and a projector, establishing a point cloud model of a gesture and a fingertip in a three-dimensional space according to the point cloud data of all the stripe central points, and judging touches of the gesture and the fingertip according to the point cloud model.

10. A computer equipment, comprising a memory, a processor and a computer program stored in the memory and executed by the processor, wherein the processor executes the computer program to implement the following acts of:

traversing a captured image to acquire a grayscale value of each pixel point, and constructing, according to the grayscale values of pixel points, an ideal neighborhood grayscale distribution of pixel points in a direction perpendicular to a stripe direction;

traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point;

classifying stripe central points in an updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

11. The computer equipment according to claim 10, wherein the processor executes the computer program to implement the following acts of:

comparing the grayscale value of the pixel point with a preset threshold, and constructing the ideal neighborhood grayscale distribution in the direction perpendicular to the stripe direction for the pixel point having the grayscale value greater than the preset threshold.

12. The computer equipment according to claim 11, wherein the processor executes the computer program to implement the following acts of:

constructing the ideal neighborhood grayscale distribution in the direction perpendicular to the stripe direction according to a formula as below:

$$y_{i+d} = y_i - \frac{4y_i}{W^2}d^2;$$

where, $y_i$ is a grayscale value to which an ideal stripe central point $x_i$ corresponds, $y_{i+d}$ is a grayscale value of a point $x_{i+d}$ having a distance d from $x_i$, and W denotes a stripe width.

13. The computer equipment according to claim 11, wherein the processor executes the computer program to implement the following acts of:

calculating a fit degree of an ideal central point grayscale distribution of the pixel point having the grayscale value greater than the preset threshold according to the ideal neighborhood grayscale distribution of the pixel point having the grayscale value greater than the preset threshold and an actual neighborhood grayscale distribution;

calculating a stripe continuity probability of a current pixel point and a neighborhood based on the preset output image;

calculating a probability of a stripe central point of the current pixel point and a probability constitutional sequence of points in the neighborhood according to the fit degree of the ideal central point grayscale distribution of the pixel point having the grayscale value greater than the preset threshold and the stripe continuity probability of the current pixel point and the neighborhood; and judging whether the probability of the stripe central point of the current pixel point is a maximum value in the probability constitutional sequence of points in the neighborhood, and performing the image update on the preset output image if the probability of the stripe central point of the current pixel point is the maximum value in the probability constitutional sequence of points in the neighborhood.

14. The computer equipment according to claim 13, wherein the processor executes the computer program to implement the following acts:

said traversing is traversing row by row, or traversing column by column; and said traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point further comprises:

if it is judged that the current pixel point is not the stripe central point, judging whether a traversal of a row or a column where the current pixel point is located is completed; if the traversal of the row or the column where the current pixel point is located is not completed, further judging whether a pixel point next to the current pixel point is a stripe central point according to a grayscale value of the pixel point next to the current pixel point and a grayscale distribution of points in a neighborhood of the pixel point next to the current pixel point and in combination with the updated output image; and if the traversal of the row or the column where the current pixel point is located is completed, judging whether a traversal of all rows or columns is completed, if the traversal of all the rows or columns is not completed, judging pixel points of a next row or column to determine whether the pixel points of the next row or column are stripe central points, and if the traversal of all rows or columns is completed, performing a stripe extraction and outputting the updated output image.

15. The computer equipment according to claim 10, wherein the processor executes the computer program to implement the following acts of:

performing the homography transformation on the updated output image to output a homography transformed image;

finding the set of non-offset stripe central points from the homography transformed image based on the structured light image, and determining the set of non-offset stripes according to the set of non-offset stripe central points;

determining a set of stripes with offset central points with an offset according to the set of non-offset stripe central points; and classifying the set of stripes with offset central points by using the FloodFill algorithm to obtain a set of classified stripes with offset.

16. The computer equipment according to claim 15, wherein the processor executes the computer program to implement the following acts of:

finding a breakpoint of a stripe from the set of non-offset stripes, and constructing a bipartite graph structure of the non-offset stripes according to the breakpoint;

finding an end point of a stripe from the set of classified non-offset stripes, and constructing a bipartite graph structure of the stripes with offset according to the end point; and matching the bipartite graph structure of non-offset stripes with the bipartite graph structure of stripes with offset by using a graph matching algorithm to obtain a correspondence between stripes with offset and non-offset stripes.

17. The computer equipment according to claim 16, wherein the processor executes the computer program to implement the following acts of:

determining stripe positions, corresponding to the stripe central points in the updated output image, in the structured light image according to the correspondence between stripes with offset and non-offset stripes;

obtaining epipolar line positions, corresponding to the stripe central points in the updated output image, in the structured light image by using the triangulation method according to stripe positions, corresponding to the stripe central points in the updated output image, in the structured light image; and calculating decoding positions, corresponding to the stripe central points in the updated output image, in the structured light image according to the epipolar positions, corresponding to the stripe central points in the updated output image, in the structured light image, and the decoding position being an intersection of a corresponding epipolar line and a corresponding stripe that correspond to the stripe central point in the updated output image, in the structured light image.

18. The computer equipment according to claim 10, wherein the processor executes the computer program to implement the following acts of:

acquiring point cloud data of all the stripe central points according to the decoded output image in combination with intrinsic and extrinsic parameters of a camera and a projector, establishing a point cloud model of a gesture and a fingertip in a three-dimensional space according to the point cloud data of all the stripe central points, and judging touches of the gesture and the fingertip according to the point cloud model.

19. A non-transitory computer-readable storage medium, wherein the non-transitory computer-readable storage medium stores a computer program being used to execute the following acts of:

traversing a captured image to acquire a grayscale value of each pixel point, and constructing, according to the grayscale values of pixel points, an ideal neighborhood grayscale distribution of pixel points in a direction perpendicular to a stripe direction;

traversing the captured image, finding all stripe central points in the captured image according to the grayscale value of each pixel point and the ideal neighborhood grayscale distribution and in combination with a preset output image, and performing, whenever finding out each of the stripe central points, update the preset output image according to the found stripe central point;

classifying stripe central points in an updated output image into different stripes;

determining, according to the different stripes, a correspondence between stripes in the updated output image and stripes in a structured light image; and decoding the stripe central points in the updated output image, by using triangulation method in combination with the correspondence between the stripes in the updated output image and the stripes in the structured light image.

20. The non-transitory computer-readable storage medium according to claim 19, wherein the computer program is used to execute:

performing the homography transformation on the updated output image to output a homography transformed image;

finding the set of non-offset stripe central points from the homography transformed image based on the structured light image, and determining the set of non-offset stripes according to the set of non-offset stripe central points;

determining a set of stripes with offset central points with an offset according to the set of non-offset stripe central points; and classifying the set of stripes with offset central points by using the FloodFill algorithm to obtain a set of classified stripes with offset.

* * * * *